United States Patent
Sharma et al.

(10) Patent No.: US 10,192,560 B2
(45) Date of Patent: *Jan. 29, 2019

(54) ROBUST SPECTRAL ENCODING AND DECODING METHODS

(71) Applicant: Digimarc Corporation, Beaverton, OR (US)

(72) Inventors: Ravi K. Sharma, Portland, OR (US); Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,642

(22) Filed: Sep. 25, 2017

(65) Prior Publication Data

US 2018/0130477 A1    May 10, 2018

Related U.S. Application Data

(63) Continuation of application No. 15/289,792, filed on Oct. 10, 2016, now Pat. No. 9,773,504, which is a continuation of application No. 12/125,840, filed on May 22, 2008, now Pat. No. 9,466,307.

(60) Provisional application No. 60/939,580, filed on May 22, 2007.

(51) Int. Cl.
| | | |
|---|---|---|
| *G10L 19/018* | (2013.01) | |
| *G10L 19/12* | (2013.01) | |
| *G10L 15/08* | (2006.01) | |
| *G10L 21/055* | (2013.01) | |
| *G10L 19/00* | (2013.01) | |
| *G10L 19/022* | (2013.01) | |
| *G10L 19/26* | (2013.01) | |

(52) U.S. Cl.
CPC ............ *G10L 19/018* (2013.01); *G10L 15/08* (2013.01); *G10L 19/0019* (2013.01); *G10L 19/022* (2013.01); *G10L 19/12* (2013.01); *G10L 19/265* (2013.01); *G10L 21/055* (2013.01)

(58) Field of Classification Search
None
See application file for complete search history.

(56) References Cited

U.S. PATENT DOCUMENTS

| | | | | | |
|---|---|---|---|---|---|
| 5,012,517 | A | * | 4/1991 | Wilson | G10L 25/90 704/203 |
| 5,042,069 | A | * | 8/1991 | Chhatwal | G10L 19/002 704/203 |
| 6,496,798 | B1 | * | 12/2002 | Huang | G10L 19/167 704/201 |
| 7,117,148 | B2 | * | 10/2006 | Droppo | G10L 21/0208 704/228 |
| 7,382,886 | B2 | * | 6/2008 | Henn | G10L 19/008 381/23 |
| 7,778,827 | B2 | * | 8/2010 | Jelinek | G10L 19/24 704/223 |
| 7,783,477 | B2 | * | 8/2010 | D'Haes | G10L 25/48 704/203 |

(Continued)

*Primary Examiner* — Neeraj Sharma
(74) *Attorney, Agent, or Firm* — Digimarc Corporation

(57) ABSTRACT

Spectral encoding methods are more robust when used with improved weak signal detection and synchronizations methods. Further robustness gains are achieved by using informed embedding, error correction and embedding protocols that enable signal to noise enhancements by folding and pre-filtering the received signal.

15 Claims, 2 Drawing Sheets

(56) References Cited

U.S. PATENT DOCUMENTS

| | | | |
|---|---|---|---|
| 7,953,604 B2 * | 5/2011 | Mehrotra | G10L 21/038 704/200.1 |
| 2008/0126082 A1 * | 5/2008 | Ehara | G10L 19/24 704/205 |
| 2009/0248407 A1 * | 10/2009 | Oshikiri | G10L 19/26 704/226 |

* cited by examiner

ROBUST SPECTRAL ENCODING AND DECODING METHODS

RELATED APPLICATION DATA

This application is a continuation of U.S. application Ser. No. 15/289,792, filed Oct. 10, 2016 (now U.S. Pat. No. 9,773,504) which is a continuation of U.S. application Ser. No. 12/125,840, filed May 22, 2008 (now U.S. Pat. No. 9,466,307), which claims benefit of Provisional Application No. 60/939,580, filed May 22, 2007, which is incorporated herein by reference.

TECHNICAL FIELD

The invention relates to signal processing, and specifically, media signal processing for encoding and decoding auxiliary data.

BACKGROUND AND SUMMARY

U.S. Pat. Nos. 7,006,555, 6,968,564, and 6,272,176 and U.S. Patent Publication 2005-0177361, which are hereby incorporated by reference, disclose methods of encoding and decoding inaudible auxiliary data in audio signals. These techniques have been used to encode data in the audio portion of TV programs for broadcast monitoring and audience measurement. In these applications, the inaudible codes must be recoverable from the audio signal despite distortions of the audio signal incurred during the broadcast of the programs. These distortions may include digital to analog (D/A) and analog to digital (A/D) conversions (and associated sampling operations) as well as lossy compression. While the methods have been developed to enable reasonable recovery of the encoded auxiliary data, they are not sufficiently robust for applications in which the audio signal is subjected to greater distortions, such as repeated sampling operations (e.g., including re-sampling occurring in a series of D/A and A/D conversions), time scale changes, speed changes, successive compression/decompression operations (e.g., including transcoding into different compression formats). These additional distortions occur when the program content is captured at a receiver, re-formatted and uploaded to the Internet, such as the case when TV programs are uploaded to web sites. For example, the audio portion of the TV program is captured from an analog output, converted to digital (which includes re-sampling), compressed in a format compatible with the content hosting web site, uploaded, and then transcoded into a format for storage on the content distribution servers of the web site and suitable for streaming in response to requests from the web site visitors.

Such distortions tend to weaken the embedded inaudible code signal preventing its recovery. Further, they make it more difficult for the decoder to synchronize the reading of the inaudible code. The start codes included with the code signal are often insufficient, or not processed effectively, to enable the decoder to ascertain the location and time scale of the inaudible code signal in the received audio signal.

This document describes methods for making spectral encoding methods more robust. These methods include methods for decoding that address weak signal and/or synchronization issues caused by distortions to the encoded audio signal. These methods also include improvements to the encoding method and corresponding decoding methods that improve the robustness of the embedded data to distortion.

One aspect of the invention is a device for decoding data embedded in an audio signal, in which the data is embedded by adjusting signal values at frequencies. The device comprises a memory in which is stored blocks of the media signal. A processor is in communication with the memory to obtain blocks of the audio signal. The processor executes instructions to:

perform an initial synchronization by converting blocks of the audio to Fourier magnitude data, pre-filtering the Fourier magnitude data to produce first pre-filtered blocks, summing the first pre-filtered blocks to produce a first accumulated block, and correlating the first accumulated block with a frequency domain pattern to detect a shift of an embedded code signal; and perform decoding of variable code data at the detected shift by converting blocks of the audio to Fourier magnitude data at the detected shift, pre-filtering the Fourier magnitude data to produce second pre-filtered blocks, summing the second pre-filtered blocks to produce a second accumulated block, and correlating the accumulated block with code signals to detect one of the code signals.

One method of embedding data in an audio signal adjusts signal values at frequencies selected from among set of frequency locations in predetermined frequency bands. This method uses signal characteristics of the audio signal to select a pattern of frequencies from among the set of frequency locations that satisfy desired performance criteria for embedding data. It then embeds the data at the selected pattern of frequencies by adjusting the signal values at the frequencies. The selected pattern of frequencies varies according to the signal characteristics and the desired performance criteria.

A method of decoding data embedded in a media signal performs an initial approximation of time scale changes of the media signal using at least a portion of the embedded data in a first domain, such as the Fourier magnitude domain. It performs synchronization of the embedded data in a second domain, different from the first domain (e.g., phase), and decodes embedded data after synchronization.

Another decoding method employs a least squares method to detect embedded data at the frequencies, and uses the results of the least squares method to decode the embedded data from the media signal.

Further features will become apparent with reference to the following detailed description and accompanying drawings.

DETAILED DESCRIPTION

The following embodiments improve the robustness of the spectral encoding and decoding methods of U.S. Pat. Nos. 7,006,555, 6,968,564, and 6,272,176 and U.S. Patent Publication 2005-0177361. A description of these methods is substantially covered in U.S. Pat. No. 7,006,555 ('555 patent) and 2005-0177361 ('361 publication). For the sake of illustration, the following embodiments are designed for the encoding and decoding methods of these patents that encode inaudible auxiliary codes by selectively increasing/decreasing the audio signal energy at a set of frequencies relative to the energy of neighboring frequencies. The basic signal processing improvements described for these embodiments can be adapted for alternative encoding and decoding schemes.

Decoder Improvements

Detector improvements enable accurate recovery of the auxiliary data in the inaudible code signal weakened through distortions or distorted in a manner (e.g., time scale changes) that undermines synchronization. One advantage to detector-only improvements is that it enables recovery from previously encoded audio without requiring changes to the encoder and re-encoding of the audio signal.

These detector improvements fall in two categories: synchronization methods and weak signal methods. These methods, which often overlap due to the similarities of the synchronization and data components of the inaudible code signal, are described below.

Figure 1:
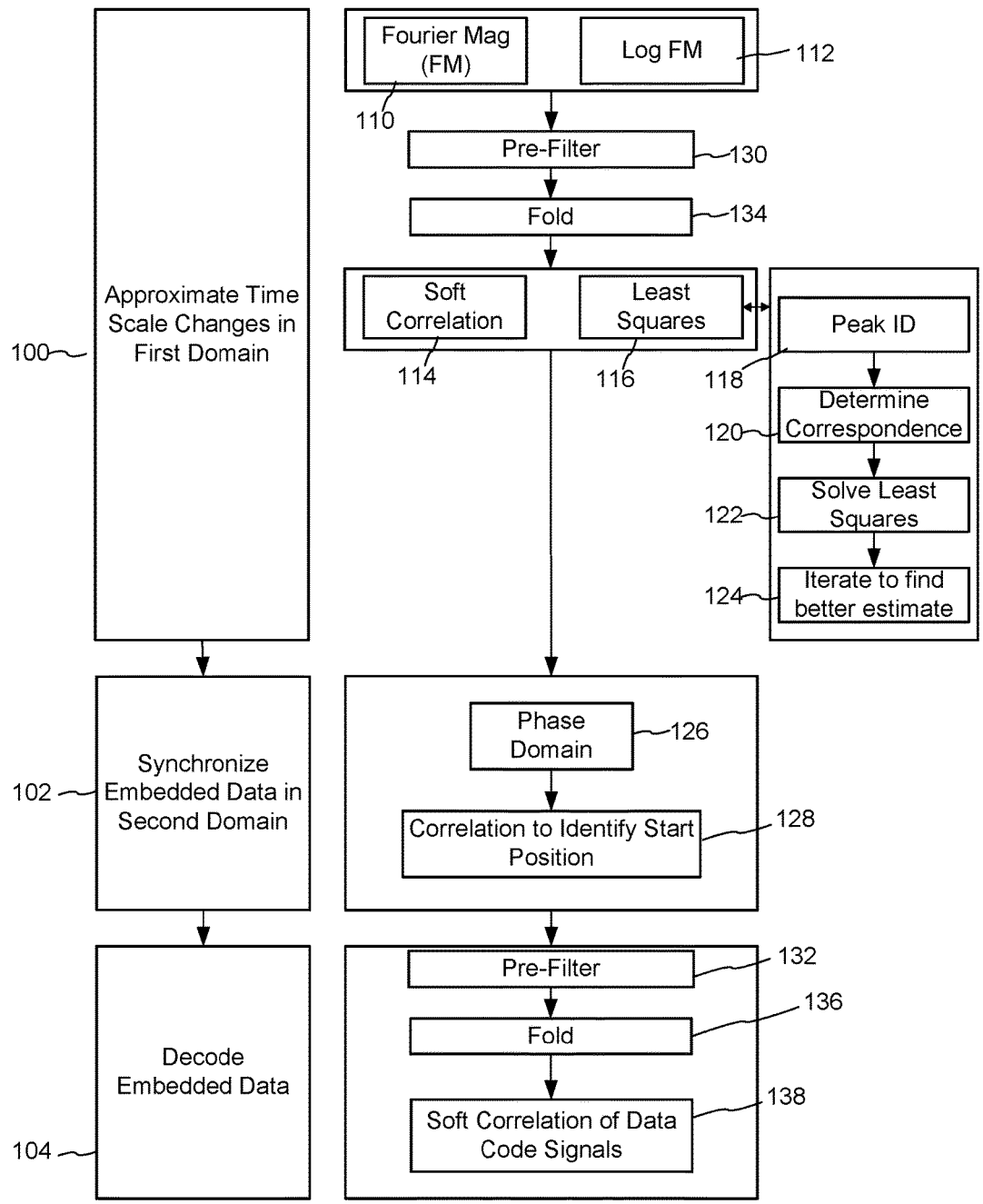
FIG. 1 is a diagram illustrating methods for decoding date embedded in media signal, including synchronization of embedded data and decoding auxiliary data.

As summarized above, one aspect of the invention comprises a method of decoding data embedded in a media signal, wherein the data is embedded in the media signal by adjusting signal values at frequencies. FIG. 1 is a diagram illustrating methods for decoding date embedded in a media signal. One decoding method comprises performing an initial approximation of time scale changes of the media signal using at least a portion of the embedded data in a first domain (as shown in block 100); performing synchronization of the embedded data in a second domain, different from the first domain (as shown in block 102); and decoding the embedded data (as shown in block 104). Further detail about alternative implementations of this signal processing is shown to the right of blocks 100-104 in FIG. 1 and described below. Also as summarized above, another aspect of the invention is a method of decoding data embedded in a media signal, wherein the data is embedded in the media signal by adjusting signal values at frequencies. This decoding method comprises performing a least squares method (116 and 118-124) to detect embedded data at the frequencies and using the results of the least squares method to decode the embedded data from the media signal (104, and 132-138). Block 116 depicts an example of where a least squares method may reside in the processing flow of a particular embedded data decoder, and blocks 118-124 show a specific example of performing a least squares method.

Re-sampling of the audio and time scale changes introduce distortions to the positions and time scale of the inaudible code relative to the original positions and times scale at the time of its encoding. This causes the location of the changes made to frequencies (e.g., the local maxima and minima) to encode elements of the code signal to shift.

One approach is to do a conversion of the Fourier magnitude data (110) to the log scale (112). To perform synchronization, this log conversion step is inserted into the method of the '361 publication after FFT of the received audio signal. This log conversion of the Fourier magnitude data removes time scale distortion due to re-sampling.

Further distortion (e.g., non-linear distortion) is measured and compensated for in additional detector refinement stages. One such stage correlates a synchronization and/or data signal pattern at the frequency locations of the pattern with the Fourier magnitude data in the log domain as described in U.S. Pat. No. 6,424,725, which is hereby incorporated by reference.

Preferably, the correlator applies a "soft" correlation of the 5 frequency locations of the synch signal in the method of the '361 publication (114). The same applies for three bit data codes in each of the data blocks described in the '361 publication (138).

Another approach is to use a least squares optimization method (116) to compute the time scale changes between the original embedded code signal and the received embedded code signal. These time scale changes are approximated by an affine transform. Generally speaking, an affine (strictly, linear) mapping in the frequency domain is fully defined by 2 points. Knowing the original locations of 2 points, and their transformed locations, one can derive the linear mapping (e.g., there are 4 equations, 4 unknowns). In this approach, the decoder uses "Least Squares" estimation for obtaining the solution. This gives a maximum likelihood estimate if errors (in code signal frequency locations) are independently and normally distributed. One embodiment of the method is:

1. Peak identification—identify peaks (potential code signal frequency locations) in Fourier magnitude domain for given signal (118)
2. Correspondence determination—determine which peak (transformed code signal frequency location) corresponds to which code signal element (120)
3. Least squares solution—calculate affine transform using least squares—requires the location of the original code signal frequencies and the transformed code signal frequencies. (122)
4. Iteration—use the solution in Step 3 as a starting point to find a better estimate if required (124)

All decoding (both of synchronization and variable code data) is preferably performed in the log domain (112) so that re-sampling and other time scale errors are reduced or eliminated.

Alternatively, after time scale distortions are approximated, further synchronization and data signal extraction can be performed in other domains. For example, one embodiment uses the phase (126) of the encoded signal (e.g., correlates the phase of the original encoded signal with the received signal (128)) to identify the start location more accurately.

Another enhancement is to capture a sufficiently long block of audio such that multiple instances of the synchronization data are included in the captured block. The detector then detects the code signal using a match filtering and/or least squares approximation over a longer window (e.g., one in which multiple sync blocks are included). For example, in the '361 publication, sync blocks occur about every 3 seconds in the original audio. Multiple sync blocks can be used together to form the above mentioned synchronization pattern, which is then detected using the above improvements.

A related improvement is to retain received data for further decoding analysis, even if a first pass decoding does not yield an accurate data recovery. In particular, the decoder retains decoding results and Fourier magnitude data of candidate synch block information, even if the next block yields no code data at first. The current approach discards the current synch if the next block yields no data. In contrast, this improvement enables the detector to accumulate evidence of a code signal, and then go back to the previous block if subsequent detection results indicate that the inaudible code signal is likely present.

Another improvement is to pre-filter the Fourier magnitude data to sharpen the peaks of the sync and data signals encoded by the spectral encoding methods referenced above (e.g., 130 for sync signal, 132 for data signal). Specifically, a pre-filter is applied to increase the signal to noise ratio of the code signal. A Fourier Magnitude pre-filter is particular useful when used as a pre-process for the soft correlation described above. Filtering techniques are described in U.S.

Pat. Nos. 6,614,914, 6,988,202 and 7,076,082, which are hereby incorporated by reference.

Additional pre-filtering, synchronization and weak signal decoding methods are also described in U.S. Pat. No. 6,122,403, which is hereby incorporated by reference.

Another improvement is to fold together (e.g., sum) successive blocks of the Fourier magnitude data to increase inaudible code signal to noise ratio (134, 136). Depending on how frequencies are selected to encode the synchronization and data components, this approach may require changes to the embedder so that frequencies that represent the same code data are accumulated over time (rather than causing destructive interference among different data elements).

A combination of filtering and folding of Fourier magnitude data, accumulated over time, improves robustness further. One embodiment of the decoder uses accumulation of the received data and/or moving average or exponential moving average filtering of the received data to improve signal to noise ratio of the inaudible code signal.

Encoder Improvements

Figure 2:
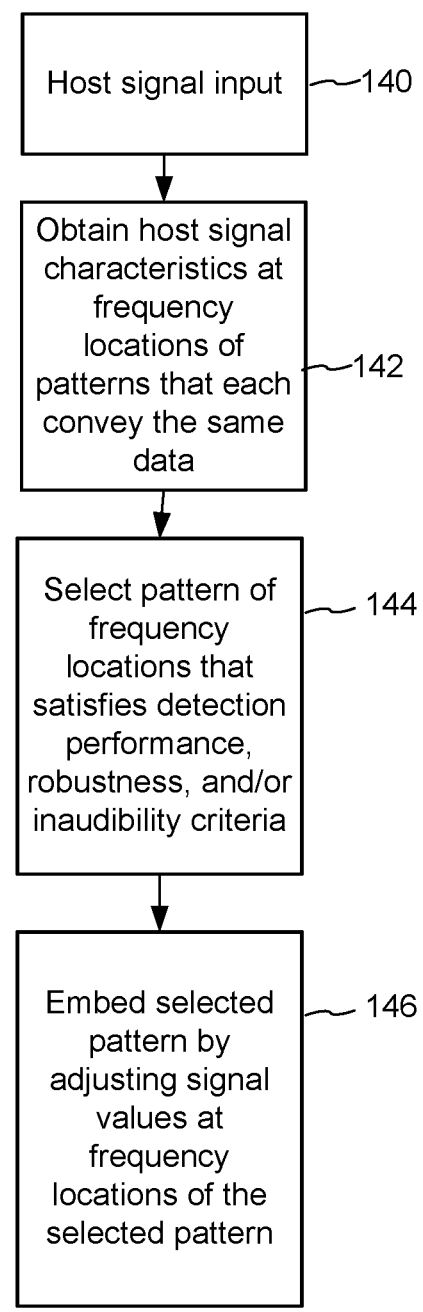
FIG. 2 is a diagram illustrating methods for embedding data in a media signal.

As summarized above, and shown in FIG. 2, one aspect of the invention comprises a method of embedding data in a media signal (140), wherein the data is embedded in the media signal by adjusting signal values at frequencies selected from among a set of frequency locations in predetermined frequency bands (146). The method comprises using signal characteristics of the media signal (142) to select a pattern of frequencies from among the set of frequency locations that satisfy performance criteria for embedding data (144); and embedding the data at the selected pattern of frequencies by adjusting the signal values at the frequencies, wherein the selected pattern of frequencies varies according to the signal characteristics and the performance criteria (146).

The '361 publication describes a spectral encoding example in which the encoder selects frequency locations of the inaudible code signal from among 8 frequency locations in each of 5 frequency bands. An improved encoder uses "informed" encoding to select the code signal pattern from among some number of various other patterns which all convey the same data. The "informed" aspect of the encoding refers to the encoder's selection of the pattern that uses information about the host audio signal characteristics (142) to select the pattern that gives the best performance in terms of desired criteria, such as detection performance, robustness, and/or inaudibility of the selected pattern in the given audio data (144).

Another improvement that involves updates to the embedder are changes to the data encoding protocol to include error correction. More effective error correction coding than repetition coding should be included. One option is to use block codes. Examples of error correction include BCH and Reed Solomon encoding. Convolution and turbo codes may be used as well, along with Viterbi decoding of soft errors.

See, for example, U.S. Pat. No. 6,614,914, which is hereby incorporated by reference, which includes decoding and encoding enhancements, including pre-filtering, error correction, soft correlation, refinement stages in the detector, folding of received data to improve SNR of the embedded data, etc.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A device for decoding a digital watermark embedded in an audio signal, wherein the digital watermark is embedded in the audio signal by adjusting signal values, the device comprising:

a memory in which is stored blocks of the audio signal;

a processor in communication with the memory to obtain blocks of the audio signal, the processor configured with instructions to:

perform an initial synchronization of the digital watermark, distorted due to time scale change, by converting blocks of the audio to frequency domain data, pre-filtering the frequency domain data to produce first pre-filtered blocks, summing the first pre-filtered blocks to produce a first accumulated block, the first pre-filtered blocks being selected over a sufficiently long block of audio such that plural instances of watermark signal representing the same code at different time locations are accumulated, and correlating the first accumulated block with a pattern to detect a time scale of an embedded code signal; and perform decoding of variable code data of the digital watermark at the detected time scale by correlating phase of the audio signal at the detected shift with a data signal pattern, wherein the processor is configured with instructions to decode the variable code data by correlating phase of the audio signal with a synchronization code signal to identify a start position of the variable code, and correlating phase of the audio signal with data code signals to detect data code signals encoded as the variable code data of the digital watermark.

2. The device of claim 1 wherein the processor is configured with instructions to perform a least squares method to approximate time scale changes of the data embedded in the audio signal.

3. The device of claim 1 wherein the processor is configured with instructions to perform a soft correlation between a pattern signal at selected frequencies and the audio signal to detect the shift of the embedded code signal.

4. A tangible non-transitory, computer readable medium, on which is stored instructions, which, when executed by a computer, cause the computer to decode a digital watermark embedded in an audio signal, wherein the digital watermark is embedded in the audio signal by adjusting signal values, the instructions, which when executed by the computer, cause the computer to:

perform an initial synchronization of the digital watermark, distorted due to time scale change by converting blocks of the audio to frequency domain data, pre-filtering the frequency domain to produce first pre-filtered blocks, summing the first pre-filtered blocks to produce a first accumulated block, the first pre-filtered blocks being selected over a sufficiently long block of audio such that plural instances of watermark signal representing the same code at different time locations are accumulated, and correlating the first accumulated block with a pattern to detect a time scale of an embedded code signal; and perform decoding of variable code data of the digital watermark at the detected time scale by correlating phase of the audio signal at the detected shift with a data signal pattern, wherein the instructions on the medium cause the computer to decode the variable code data by correlating phase of the audio signal with a synchronization code signal to identify a start position of the variable code, and correlating phase of the audio signal with data code signals to detect data code signals encoded as the variable code data of the digital watermark.

5. The non-transitory computer readable medium of claim 4, comprising instructions, which when executed by the computer, perform a least squares method to approximate time scale changes of the data embedded in the audio signal.

6. The non-transitory computer readable medium of claim 4, comprising instructions, which when executed by the computer, perform a soft correlation between a pattern signal at selected frequencies and the audio signal to detect the shift of the embedded code signal.

7. The device of claim 2 wherein the processor is configured with instructions to determine a least squares mapping between peak locations of the frequency domain data in the first accumulated block and code signal locations.

8. The device of claim 7 wherein first accumulated block comprises frequency domain data summed from plural sync blocks.

9. The device of claim 1 wherein the processor is configured with instructions to perform a soft correlation between a pattern signal and the first accumulated block to detect variable code data.

10. The non-transitory computer readable medium of claim 5 comprising instructions, which when executed by a computer, cause the computer to determine a least squares mapping between peak locations of the frequency domain data in the first accumulated block and code signal locations.

11. The non-transitory computer readable medium of claim 10 wherein first accumulated block comprises frequency domain data of plural sync blocks.

12. The non-transitory computer readable medium of claim 4 comprising instructions, which when executed by a computer, cause the computer to perform a soft correlation between a pattern signal and the first accumulated block to detect variable code data.

13. A method for decoding a digital watermark embedded in an audio signal, the method comprising:
converting blocks of the audio signal to frequency domain data;
pre-filtering the frequency domain data to produce first pre-filtered blocks;
summing the first pre-filtered blocks to produce a first accumulated block, the first pre-filtered blocks being selected over a sufficiently long block of audio such that plural instances of watermark signal representing the same code at different time locations are accumulated;
detecting signal peaks in the first accumulated block;
determining a time scale change of the digital watermark based on locations of the signal peaks; and
decoding variable code data encoded in the digital watermark by correlating phase of the audio signal at the determined time scale change with a data signal pattern, the decoding comprising correlating phase of the audio signal with a synchronization code signal to identify a start position of the variable code, and correlating phase of the audio signal with data code signals to detect data code signals encoded as the variable code data of the digital watermark.

14. The method of claim 13 wherein the determining includes correspondence between the signal peaks and code signal elements, and determining a transform that maps code signal elements to corresponding signal peaks through a least squares estimation.

15. The method of claim 13 further including correlating plural code signal patterns corresponding to data signal elements with the accumulated data of the first block to detect variable code signals within the audio signal.

* * * * *